(12) United States Patent
Thomas

(10) Patent No.: US 7,916,908 B1
(45) Date of Patent: Mar. 29, 2011

(54) FINGERPRINT SENSOR AND METHOD OF TRANSMITTING A SENSOR IMAGE TO REDUCE DATA SIZE AND DATA RATE

(75) Inventor: Christopher Thomas, San Diego, CA (US)

(73) Assignee: SMSC Holdings S.à.r.l, Luxembourg (LU)

(*) Notice: Subject to any disclaimer, the term of this patent is extended or adjusted under 35 U.S.C. 154(b) by 898 days.

(21) Appl. No.: 11/837,532

(22) Filed: Aug. 12, 2007

Related U.S. Application Data

(60) Provisional application No. 60/824,708, filed on Sep. 6, 2006.

(51) Int. Cl.
  *G06K 9/28* (2006.01)
(52) U.S. Cl. .................................................. 382/124
(58) Field of Classification Search .................. None
  See application file for complete search history.

(56) References Cited

U.S. PATENT DOCUMENTS

| | | | |
|---|---|---|---|
| 4,429,413 A | 1/1984 | Edwards | |
| 7,194,116 B2 | 3/2007 | Du et al. | |
| 7,197,168 B2 | 3/2007 | Russo | |
| 7,212,658 B2 | 5/2007 | Du et al. | |
| 7,289,649 B1 * | 10/2007 | Walley et al. | 382/124 |
| 7,460,696 B2 | 12/2008 | Rowe | |
| 2002/0012455 A1 | 1/2002 | Benckert | |
| 2002/0050518 A1 | 5/2002 | Roustaei | |
| 2004/0208348 A1 * | 10/2004 | Baharav et al. | 382/124 |
| 2006/0069826 A1 | 3/2006 | Lei et al. | |
| 2006/0078178 A1 * | 4/2006 | Shatford | 382/124 |
| 2006/0294394 A1 | 12/2006 | Cheng et al. | |
| 2007/0154073 A1 * | 7/2007 | Hamid et al. | 382/124 |

OTHER PUBLICATIONS

U.S. Appl. No. 11/832,763, Thomas et al.

\* cited by examiner

*Primary Examiner* — Brian P Werner
(74) *Attorney, Agent, or Firm* — Haynes and Boone, LLP

(57) ABSTRACT

A fingerprint imager uses a non-rectangular image readout to reduce the bandwidth and data size of the read-out image. Narrow-width rows in the central portion of the image are used to align successive partial image frames of the fingerprint to reconstruct a full image of the fingerprint using full-width rows of the fingerprint frames.

14 Claims, 4 Drawing Sheets

FINGERPRINT SENSOR AND METHOD OF TRANSMITTING A SENSOR IMAGE TO REDUCE DATA SIZE AND DATA RATE

RELATED APPLICATIONS

This application claims priority from U.S. provisional application No. 60/824,708 filed Sep. 6, 2006 entitled "Fingerprint sensor and method of transmitting a sensor image to reduce data size and data rate", incorporated herein by reference.

BACKGROUND

1. Field of Invention

The invention relates to fingerprint imaging and specifically to a readout sequence and array shape that minimizes the data needed to reconstruct an image.

2. Prior Art

Fingerprint scanners are one form of biometric verification used to access data and devices. Devices that have potential use for biometric verification include laptop computers, personal digital assistants, cellular or mobile telephone handsets, and any other device requiring access restriction or security.

Fingerprint sensing technology is well known. One method uses an alternating current excitation signal that propagates an electric field through the finger while a capacitive sensor detects the ridges and valleys in the living layer of skin beneath the skin surface. Edwards, U.S. Pat. No. 4,429,413, Jan. 31, 1984, "Fingerprint sensor" discloses an integrated circuit for transforming the topological pattern of a finger into an electric output signal.

To reduce the array size and therefore cost, instead of providing a large square array capable of capturing the entire fingerprint, the finger is manually swiped across a wide and short rectangular sensor. Consecutive images are captured as the fingerprint passes across the sensor and are combined to form a full image of the fingerprint. A fingerprint scanner is typically a two-dimensional sensor array with a pixel width count much larger than the pixel height count. Pixel dimension of 128 by 8 or 12 and 192 by 16 are common, and other pixel sizes and aspect ratios can be used.

Standard fingerprint scanners interface to a host device using a specialized signal interface intended for the scanner or a general purpose interface such as universal serial bus (USB) See Lei et al., U.S. patent application publication US 2006/0069826 published Mar. 30, 2006 for an example of a fingerprint sensor that interfaces to an external computing device over USB.

A specialized interface for the sensor precludes compatibility with existing devices that are not designed with a physical layer interface suitable for connection to the sensor. A USB interface in a fingerprint sensor requires significant die area on the device and thereby increases cost of the sensor.

Fingerprint scanners have special mechanical and electrical needs due to the exposure of the active sensor area. The sensor must be exposed for the finger to contact with the sensor. Electrostatic discharge (ESD) protection must be provided on the sensor chip, which uses die area around the active sensor region.

Reduction of the number of interface signals is highly desirable. Each input or output (I/O) pin requires a bond wire pad on the integrated circuit, which uses die area and thus increases cost. Additionally, mechanical clearance distances are required between the bonding pads and the active sensor array. Reduction in the number of pads reduces clearance requirements and reduces die size.

An interface to standard processor devices is desirable to increase compatibility and avoid redesign of existing processors. A low cost sensor is desirable, which requires minimizing die area and I/O pad count.

Benckert, US 20020012455A1 (same as WO 01/87159 A1, issued as EP 1284651 B1), "Composite image generating method, and a fingerprint detection apparatus", published 31 Jan. 2002, and incorporated herein by reference, discloses a fingerprint sensor and method of combining a sequence of partially overlapping fingerprint frames in real-time. The frames, described as 500 dpi grayscale images from a sensor measuring 1.5 mm by 14 mm (30 by 280 pixels) are transmitted to the data processor in a mobile telephone that then produces a composite fingerprint image. Correlation between the partially overlapping frames is used to determine the displacement vector between the frames that is used to assemble the frames. Sub-areas are correlated to reduce computational power.

FIG. 1 shows a prior art fingerprint sensor array configuration, comprised of a two-dimensional array of pixels and shown as a number of rows of pixels forming an image frame. As the finger is swiped across the fingerprint sensor, the series of image frames sensed by the imaging array must be transmitted to the host over an interface that has sufficient bandwidth to carry the pixel data. If the bandwidth of the interface is not sufficient, image data may be lost. Minimizing the data rate of the sensor output is desirable to reduce power consumption of the device and enable the device to interface over low speed connections.

Mobile telephone handsets and other devices commonly incorporate an analog to digital converter (ADC or A/D) used to monitor signals within the device. Additionally, such devices may include a low data rate digital interface. It is desirable to use an existing interface on a host device to avoid redesign of the host device. The bandwidth of the analog interface is generally limited due to its typical use sensing low bandwidth signals. To support a natural rate of finger swiping, the sensor must transmit an image at a sufficiently high image frame rate, which produces a bandwidth or data rate that is the product of the frame rate and frame size in pixels. The bandwidth required for conventional sensors may exceed the capability of a typical analog or digital interface. Successive frames of fingerprint images must be combined together to reconstruct a full 2-dimensional image. The reconstruction requires that some rows of each image frame are redundant so that the frames can be aligned for the reconstruction. The extent of overlap in the images can be range from 50% or higher or lower. In a 16-line image, thus 8 lines would overlap between successive frames. The reconstruction algorithms use the lines of overlap to combine the frames. Too few lines of overlap decrease the quality of the reconstructed image. The overlapping lines are redundant information and increase the total data output from the sensor.

The prior art does not teach a solution to the objective of limiting the bandwidth of the image data to match available interfaces. A reduction in the bandwidth or data rate of the signal output from the fingerprint sensor is desirable.

SUMMARY OF THE INVENTION

A series of non-rectangular two-dimensional images is transmitted from a fingerprint sensor to a host for processing and combining into a full fingerprint image. The images have several active lines that are the full width of the sensor. The images have a central region with additional narrow horizontal lines used for alignment that are a fraction of the full width to provide image information used for combining successive frames. The alignment lines have less information and transmission bandwidth is reduced by sending these shorter lines compared to full width lines. Reconstruction of a fingerprint image is done by determining the alignment of successive frames using the fractional-width central region of the image as a guide, then the full-width lines can be combined to form the fingerprint image.

DETAILED DESCRIPTION OF THE INVENTION

Figure 1:
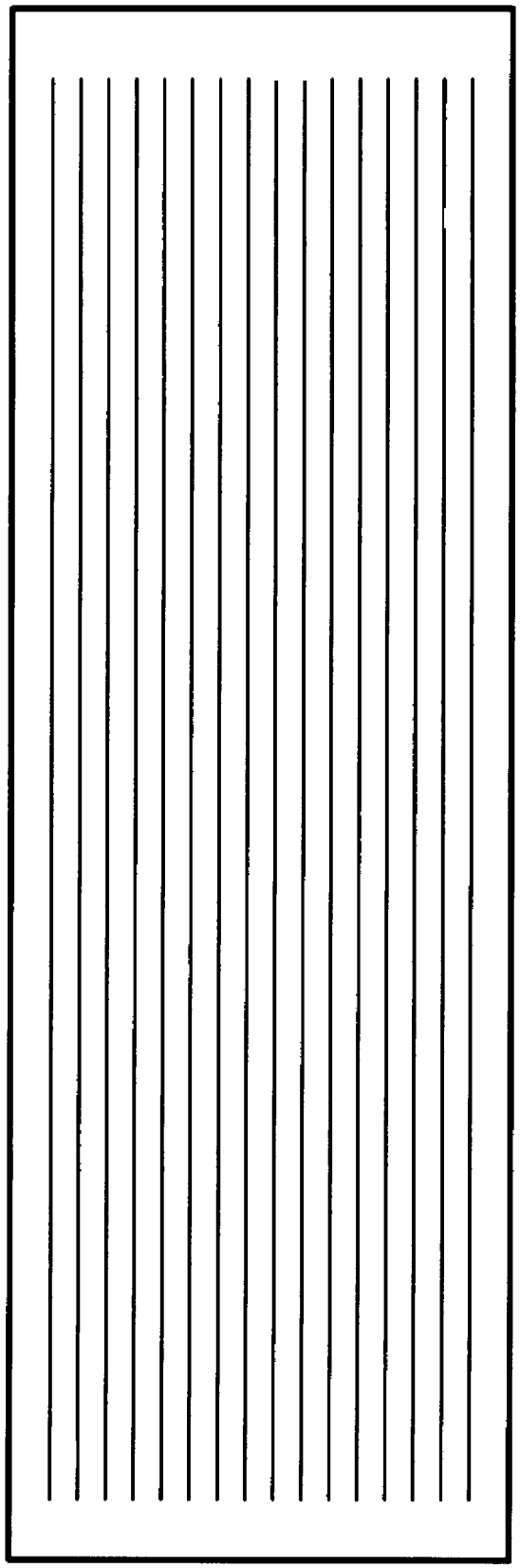
FIG. 1 shows a prior art fingerprint sensor array configuration.
Figure 2:
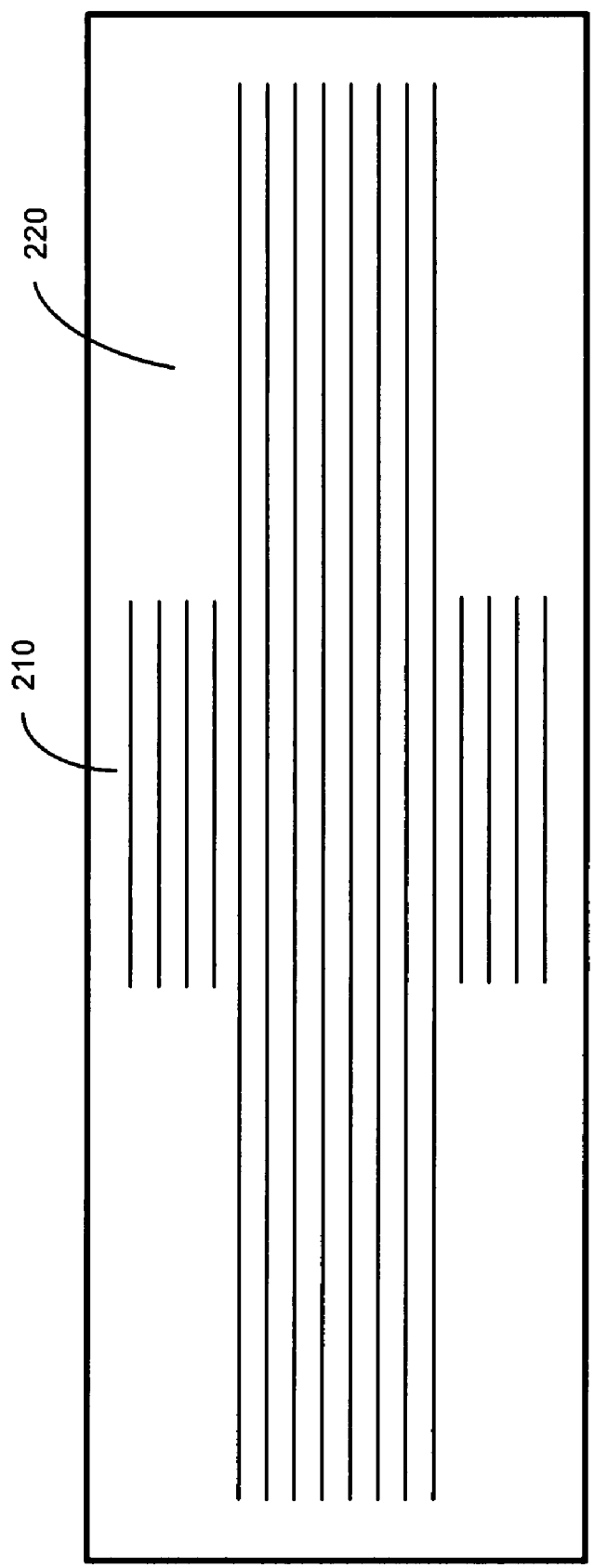
FIG. 2 shows a configuration of the transmitted portion of a fingerprint sensor array according to the present invention.

FIG. 2 shows a configuration of the transmitted portion of a fingerprint sensor array according to the present invention. The long axis of the sensor is identified as horizontal and the short axis is identified as vertical, although the actual orientation of the sensor is not critical to the operation. A line of pixels along the long axis is a horizontal line or row. The readout order of the pixels can be by columns or rows.

According to the present invention, the central region 210 of the frames is used to perform the correlation without using the full width of the sensor. The pixel values in the corner regions 220 are not transmitted. Accuracy of determining the displacement of overlapping frames is improved by having more horizontal lines of information to correlate between successive frames, which increases the effective vertical overlap of the frames. The tall and narrow-width central region provides sufficient information by utilizing additional narrow horizontal lines in the correlation. After determining the displacement between successive regions by analyzing the tall and narrow central region that provides many lines to compare frames, the wide portion of the image can be aligned and combined using the calculated displacement to construct the full fingerprint image.

The physical sensor can be a rectangular array, for example 192 by 16 pixels, while only a subset of the pixels is transmitted to the host processor, thus reducing the amount of data transmitted and the required bandwidth. The central region 210 can be for example 48 pixels wide and 16 pixels high. The full width portion of the image can be 8 pixels high. The 8 full-width lines can be in the center of the 16-pixel full-height region or offset.

Figure 3:
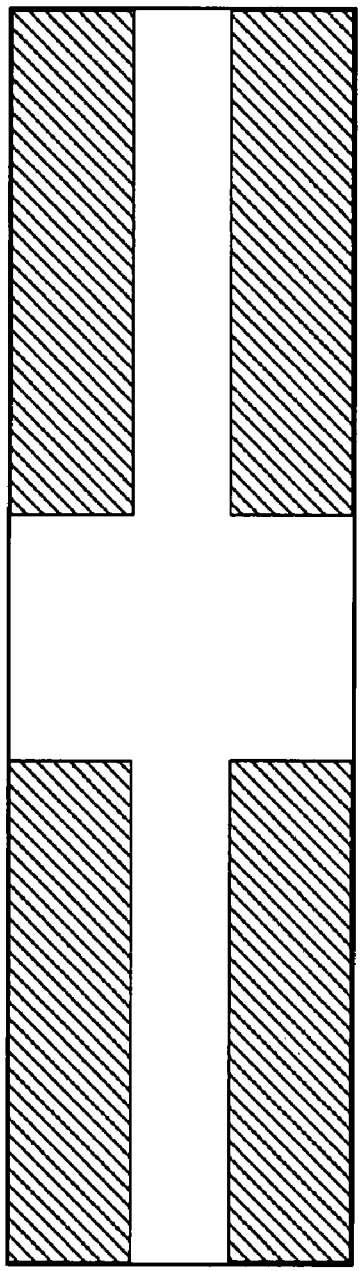
FIG. 3 shows alternate configurations of an image frame.
Figure 3:
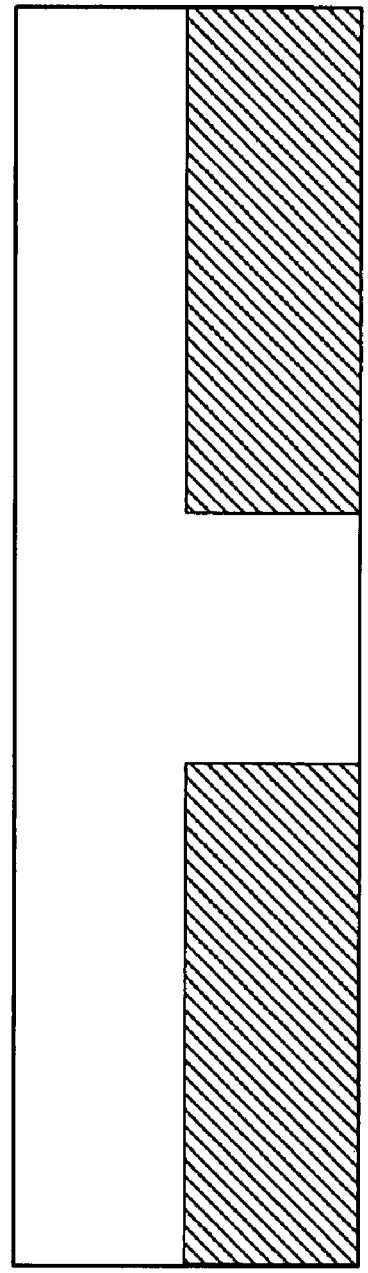

FIG. 3 shows alternate configurations of the transmitted pixels. The extra central region may have 4 lines above and 4 lines below, adjacent to the 8 full-width lines, or all 8 additional partial-width lines can be above or below, vertically adjacent to the full-width rows. If the direction of fingerprint swiping is known or dictated, the overlap of frames will be towards one edge of the image and having all available central lines towards the edge of overlap increases the overlap and the available alignment information.

The full-width lines and the partial-width lines are read from the array and transmitted to the host processor. The raw signal from the sensor can be sent as an analog signal or it can be digitized first and sent as a digital signal. The pixels outside the active portion of the partial-width lines are not transmitted and bandwidth is conserved.

Data rate of the image can be calculated as the frame size multiplied by frame rate, that is, the number of pixels in a frame multiplied by the frames per second. Reduction in frame size will directly reduce the data rate. The frame rate required is determined in part by the finger velocity.

A typical maximum finger velocity is 20 cm per second. The velocity relative to the frame rate determines the amount of overlap in the frames. The frame transmission rate can be fixed or adjustable. A single sensor design can support interface bandwidths of varying rates. The frame rate can be programmed by the host based on the bandwidth of the image sensor interface. The frame rate can be determined adaptively, by measuring finger scan velocity and adjusting the frame rate to achieve a desired overlap between frames. Frame rate can be adapted within one image or between images, for example if the reconstruction process detects insufficient overlap in frames, the frame rate can be increased. The width of the alignment rows can be varied or adapted as needed to produce a reliable correlation between images.

Detection of insufficient overlap in frames can trigger an audible or visible prompt to the user to slow the movement of the finger.

The algorithm for determining alignment between images can operate only on the central image scan pixels or can be supplemented by the full-width row pixels. Bandwidth of transmitted data will be minimized by producing frames that have maximum overlap in the central image alignment rows and minimum overlap in the full-width rows. As little as zero or one full-width row of overlap is needed.

The correlation technique of Benckert, US 20020012455A1, "Composite image generating method, and a fingerprint detection apparatus", published 31 Jan. 2002, and incorporated herein by reference, can be used to align images. Other known techniques can be used, including correlating the entire central alignment region of the scan or correlating the entire image frame. The choice of processing technique will be dictated by the processing resources and power consumption of the host processor.

Figure 4:
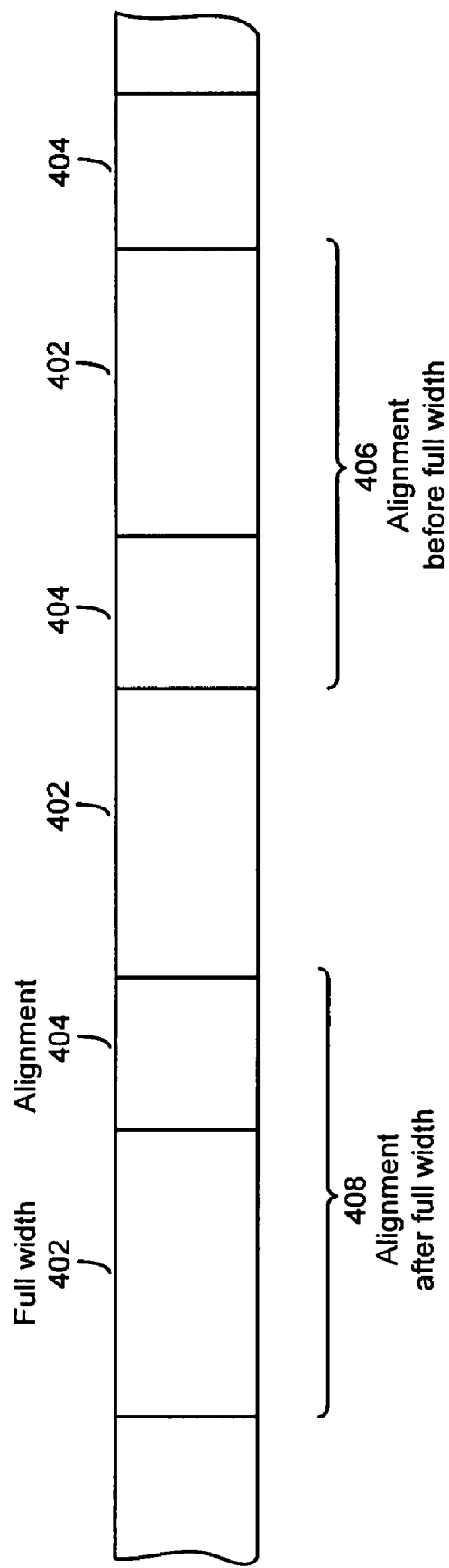
FIG. 4 shows the transmission sequence of full width and alignment region data blocks.

FIG. 4 shows a sequence of data blocks for transmitting the image frames. The bandwidth reduction technique of the present invention can be used to increase the frame rate for a given bandwidth. Full-width image frames 402 can be interleaved with shorter partial-width alignment frames 404 to reduce the time needed to transmit the frame information needed to reconstruct the fingerprint image. The partial-width alignment frames can be transmitted before (406) or after (408) the full-width frames.

The image array can be read randomly or sequentially in row-column order or column-row order. The pixels can be read at a constant rate or variable rate. The unused pixels in the frame are not transmitted and can be omitted from the array reading process or read and omitted from the transmission of the frame data. Where the pixels are sequentially read at a constant rate, an elastic buffer can be used to match the higher continuous readout rate, which appears as bursted data when the omitted data is ignored, with the lower transmission rate.

The reduced read-out data size frame of the present invention reduces data storage requirements in both the sensor and the host, thereby reducing cost.

Using the invention, a digital interface can operate at a lower data rate and an analog interface can operate with a lower analog bandwidth and A/D sample rate.

Thresholding or binarization of the image can be done on the sensor before transmission to further reduce the interface data rate. The binarized image can be transmitted as digital information, with the bit level indicating the presence of a fingerprint ridge, or as a bi-level analog signal.

The unused portion, the corner areas, of the image sensor corresponding to pixels that would not transmitted, can be replaced with other, non image-sensing, circuitry to reduce the overall size of the integrated circuit.

What is claimed is:

1. A method of reading and transmitting data from a two-dimensional image array to reduce transmission bandwidth in a fingerprint sensor, the array comprising rows of pixels, the method comprising:
   reading a plurality of full-width rows from the array;
   reading a plurality of partial-width rows from the array, wherein the partial-width rows are vertically adjacent to the full-width rows;
   transmitting the data from the full-width rows over an interface as a plurality of full-width image frames; and
   transmitting the data from the partial-width rows over the interface as a plurality of partial-width image frames, wherein the partial-width image frames are interleaved with the full-width image frames when transmitted over the interface.

2. The method of claim 1 wherein the interface is an analog interface.

3. The method of claim 1 wherein the interface is a digital interface.

4. The method of claim 1 wherein the interface is a digital signal interface with one bit per pixel, the bit level indicating the presence of a fingerprint ridge.

5. The method of claim 1 wherein the array has pixels only in areas of the array that are transmitted.

6. The method of claim 1, wherein the full-width image frames include no overlapping image data.

7. The method of claim 1, wherein the array is substantially rectangular, wherein an unused portion of the array adjacent to the partial-width rows is used for non image-sensing circuitry.

8. A fingerprint sensor for reduced read-out data size comprising:
   a two-dimensional image array comprising a plurality of full-width rows of pixels and a plurality of partial-width rows of pixels, wherein the partial-width rows are vertically adjacent to the full-width rows;
   an interface; and
   circuitry adapted to:
      read the full-width rows from the array,
      read the partial-width rows from the array,
      transmit the data from the full-width rows over the interface as a plurality of full-width image frames, and
      transmit the data from the partial-width rows over the interface as a plurality of partial-width image frames, wherein the partial-width image frames are interleaved with the full-width image frames when transmitted over the interface.

9. The fingerprint sensor of claim 8 wherein the array is substantially rectangular, wherein an unused portion of the array adjacent to the partial-width rows is used for non image-sensing circuitry.

10. The fingerprint sensor of claim 8 wherein the interface is an analog interface.

11. The fingerprint sensor of claim 8 wherein the interface is a digital interface.

12. The fingerprint sensor of claim 8 wherein the interface is a digital signal interface with one bit per pixel, the bit level indicating the presence of a fingerprint ridge.

13. The fingerprint sensor of claim 8 wherein the array has pixels only in areas of the array that are transmitted.

14. The fingerprint sensor of claim 8, wherein the full-width image frames include no overlapping image data.

* * * * *